United States Patent
Burgman et al.

(10) Patent No.: US 12,469,517 B2
(45) Date of Patent: Nov. 11, 2025

(54) AUGMENTED IN-VEHICLE COMMUNICATION

(71) Applicant: GM GLOBAL TECHNOLOGY OPERATIONS LLC, Detroit, MI (US)

(72) Inventors: Maxim Burgman, Grand Blanc, MI (US); Gaurav Talwar, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 669 days.

(21) Appl. No.: 17/959,690

(22) Filed: Oct. 4, 2022

(65) Prior Publication Data
US 2024/0112692 A1    Apr. 4, 2024

(51) Int. Cl.
| | |
|---|---|
| *G10L 21/10* | (2013.01) |
| *G06V 20/59* | (2022.01) |
| *G06V 40/16* | (2022.01) |
| *G09B 21/00* | (2006.01) |
| *G10L 17/00* | (2013.01) |

(Continued)

(52) U.S. Cl.
CPC .............. *G10L 21/10* (2013.01); *G06V 20/59* (2022.01); *G06V 40/172* (2022.01); *G09B 21/003* (2013.01); *G09B 21/006* (2013.01); *G10L 17/00* (2013.01); *H04W 4/023* (2013.01); *H04W 4/029* (2018.02); *H04W 4/48* (2018.02); *H04W 4/80* (2018.02); *H04W 16/26* (2013.01); *H04W 64/003* (2013.01); *G10L 15/26* (2013.01); *G10L 2021/065* (2013.01)

(58) Field of Classification Search
CPC ......... G10L 21/10; G10L 17/00; G10L 15/26; G10L 2021/065; G06V 20/59; G06V 40/172; G09B 21/003; G09B 21/006; H04W 4/023; H04W 4/029; H04W 4/48; H04W 4/80; H04W 16/26; H04W 64/003
USPC ........................................................ 704/231
See application file for complete search history.

(56) References Cited

U.S. PATENT DOCUMENTS

| | | | |
|---|---|---|---|
| 11,522,865 B2 * | 12/2022 | Chen ........................ | H04W 4/50 |
| 2017/0215031 A1 * | 7/2017 | Harding ............... | G01C 21/362 |

(Continued)

FOREIGN PATENT DOCUMENTS

| | | | | |
|---|---|---|---|---|
| AU | 2014248415 A1 * | 10/2015 | .......... | H04M 3/2227 |
| CA | 3138222 A1 * | 7/2021 | | |

(Continued)

*Primary Examiner* — Edwin S Leland, III
(74) *Attorney, Agent, or Firm* — Quinn IP Law (57) ABSTRACT

A communication augmentation system includes a camera, a transceiver and a computer. The camera is operation to record an image of users. The transceiver is operational to receive inbound messages from wireless devices. The inbound messages include an input content. The computer is operational to store registrations of the users, determine user locations where the users are located in response to facial profiles relative to the image, determine device locations where the wireless devices are located based on the inbound messages, associate the wireless devices with the users based on the user locations and the device locations, determine destinations of the inbound messages based on a comparison of input content to the identifiers, and transfer the input content and the destinations to the transceiver. The transceiver is further operational to transmit the input content in a plurality of outbound messages to the wireless devices based on the destinations.

20 Claims, 6 Drawing Sheets

(51) Int. Cl.
*H04W 4/02* (2018.01)
*H04W 4/029* (2018.01)
*H04W 4/48* (2018.01)
*H04W 4/80* (2018.01)
*H04W 16/26* (2009.01)
*H04W 64/00* (2009.01)
*G10L 15/26* (2006.01)
*G10L 21/06* (2013.01)

(56) References Cited

U.S. PATENT DOCUMENTS

| | | | |
|---|---|---|---|
| 2018/0032997 A1* | 2/2018 | Gordon | G06Q 30/0269 |
| 2021/0266326 A1* | 8/2021 | Chen | H04L 67/52 |
| 2021/0352335 A1* | 11/2021 | Watson | H04N 21/2187 |
| 2024/0112692 A1* | 4/2024 | Burgman | G10L 21/10 |

FOREIGN PATENT DOCUMENTS

| | | | | |
|---|---|---|---|---|
| CN | 110140337 A | * | 8/2019 | H04L 67/30 |
| TW | 202307458 A | * | 2/2023 | G06N 3/045 |
| WO | WO-2005077077 A2 | * | 8/2005 | G08B 21/028 |
| WO | WO-2018039161 A1 | * | 3/2018 | G06F 9/542 |
| WO | WO-2019246402 A1 | * | 12/2019 | H04W 4/02 |

\* cited by examiner

FIG. 12

# AUGMENTED IN-VEHICLE COMMUNICATION

INTRODUCTION

The present disclosure relates to a system and a method for augmented in-vehicle communication.

Existing in-vehicle communication arrangements generally do not accommodate unusual situations. For example, passengers with hearing impairments or visual impairments are often ignored. Furthermore, talking between a front row of seats and a back row of seats is difficult in high ambient noise environments.

Accordingly, those skilled in the art continue with research and development efforts in the field of improving intra-vehicle communications among the occupants.

SUMMARY

A communication augmentation system is provided herein. The communication augmentation system includes a camera, a transceiver and a computer. The camera is operation to record an image of a plurality of users. The transceiver is operational to receive a plurality of inbound messages from a plurality of wireless devices. The plurality of inbound messages include a plurality of input content. The computer is in communication with the transceiver and the camera. The computer is operational to store a plurality of registrations of the plurality of users. The plurality of registrations include a plurality of facial profiles and a plurality of identifiers. The computer is further operational to determine a plurality of user locations where the plurality of users are located in response to the plurality of facial profiles relative to the image, determine a plurality of device locations where the plurality of wireless devices are located based on the plurality of inbound messages, associate the plurality of wireless devices with the plurality of users based on the plurality of user locations and the plurality of device locations, determine a plurality of destinations of the plurality of inbound messages based on a comparison of the plurality of input content to the plurality of identifiers, and transfer the plurality of input content and the plurality of destinations to the transceiver. The transceiver is further operational to transmit the plurality of input content in a plurality of outbound messages to the plurality of wireless devices based on the plurality of destinations.

In one or more embodiments, the communication augmentation system further includes a microphone in communication with the computer and operational to record a plurality of sounds from the plurality of users. The plurality of registrations includes a plurality of voiceprints of the plurality of users. The computer is operational to determine the plurality of user locations in further response to the plurality of sounds relative to the plurality of voiceprints.

In one or more embodiments, the communication augmentation system further includes an artificial intelligence agent executed by the computer. The artificial intelligence agent is operational to determine the plurality of destinations of the plurality of inbound messages.

In one or more embodiments of the communication augmentation system, the plurality of registrations of the plurality of users includes a hearing impairment among one or more of the plurality of users, the artificial intelligence agent is further operational to determine where a particular destination of the plurality of destinations corresponds to the hearing impairment, and the artificial intelligence agent is further operational to translate a particular input content of the plurality of input content from speech to text prior to transferring to the transceiver for transmission to the particular destination with the hearing impairment.

In one or more embodiments of the communication augmentation system, the artificial intelligence agent is further operational to track a quality of a particular input content among the plurality of input content, and enhance the quality of the particular input content prior to transferring to the transceiver.

In one or more embodiments, the communication augmentation system further includes a speech recognition engine operational to generate dictation text from an audio input content of the plurality of input content.

In one or more embodiments of the communication augmentation system, the computer is further operational to determine if the dictation text is one of behavior oriented and intent oriented. The plurality of registrations of the plurality of users includes a vision impairment among one or more of the plurality of users.

In one or more embodiments of the communication augmentation system, the computer is further operational to transfer the dictation text to the transceiver in response to determining that the dictation text is behavior oriented.

In one or more embodiments of the communication augmentation system, the computer is further operational to generate concise text from the dictation text in response to determining that the dictation text is intent oriented and a particular destination of the plurality of destinations corresponds to the vision impairment and transfer the concise text to the transceiver. The concise text is shorter than the dictation text.

In one or more embodiments of the communication augmentation system, the camera, the transceiver and the computer are implemented in a vehicle.

A method for augmented communication is provided herein. The method includes recording an image of a plurality of users with a camera, and receiving a plurality of inbound messages from a plurality of wireless devices with a transceiver. The plurality of inbound messages include a plurality of input content. The method further includes storing a plurality of registrations of the plurality of users. The plurality of registrations include a plurality of facial profiles and a plurality of identifiers. The method includes determining a plurality of user locations where the plurality of users are located in response to the plurality of facial profiles relative to the image, determining a plurality of device locations where the plurality of wireless devices are located based on the plurality of inbound messages, associating the plurality of wireless devices with the plurality of users based on the plurality of user locations and the plurality of device locations, determining a plurality of destinations of the plurality of inbound messages based on a comparison of the plurality of input content to the plurality of identifiers, transferring the plurality of input content and the plurality of destinations to the transceiver; and transmitting the plurality of input content in a plurality of outbound messages to the plurality of wireless devices based on the plurality of destinations.

In one or more embodiments, the method further includes recording a plurality of sounds from the plurality of users with a microphone. The plurality of registrations includes a plurality of voiceprints of the plurality of users. The determining of the plurality of user locations is in further response to the plurality of sounds relative to the plurality of voiceprints.

In one or more embodiments of the method, the determining of the plurality of destinations of the plurality of inbound messages is made using an artificial intelligence agent.

In one or more embodiments, the method further includes determining where a particular destination of the plurality of destinations corresponds to a hearing impairment, and translating a particular input content of the plurality of input content from speech to text prior to transferring to the transceiver for transmission to the particular destination with the hearing impairment. The plurality of registrations of the plurality of users includes the hearing impairment among one or more of the plurality of users.

In one or more embodiments, the method further includes tracking a quality of a particular input content among the plurality of input content, and enhancing the quality of the particular input content prior to transferring to the transceiver.

In one or more embodiments, the method further includes generating dictation text from an audio input content of the plurality of input content with a speech recognition engine.

In one or more embodiments, the method further includes determining if the dictation text is one of behavior oriented and intent oriented. The plurality of registrations of the plurality of users includes a vision impairment among one or more of the plurality of users.

In one or more embodiments, the method further includes transferring the dictation text to the transceiver in response to determining that the dictation text is behavior oriented.

In one or more embodiments, the method further includes generating concise text from the dictation text in response to determining that the dictation text is intent oriented and a particular destination of the plurality of destinations corresponds to the vision impairment and transferring the concise text to the transceiver. The concise text is shorter than the dictation text.

A vehicle is provided herein. The vehicle includes a crew cabin, a camera, a transceiver, and a computer. The crew cabin is operational to hold a plurality of users. The camera is operational to record an image of the plurality of users in the crew cabin. The transceiver is operational to receive a plurality of inbound messages from a plurality of wireless devices. The plurality of inbound messages include a plurality of input content. The computer is in communication with the transceiver and the camera. The computer is operational to store a plurality of registrations of the plurality of users. The plurality of registrations include a plurality of facial profiles and a plurality of identifiers. The computer is further operational to determine a plurality of user locations where the plurality of users are located in response to the plurality of facial profiles relative to the image, determine a plurality of device locations where the plurality of wireless devices are located based on the plurality of inbound messages, associate the plurality of wireless devices with the plurality of users based on the plurality of user locations and the plurality of device locations, determine a plurality of destinations of the plurality of inbound messages based on a comparison of the plurality of input content to the plurality of identifiers, and transfer the plurality of input content and the plurality of destinations to the transceiver. The transceiver is further operational to transmit the plurality of input content in a plurality of outbound messages to the plurality of wireless devices based on the plurality of destinations.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system and/or method that augments in-vehicle communication by projecting spoken audio to wireless (e.g., Bluetooth) devices and similar impairment-use assistive devices (e.g., hearing aids, and Braille readers). The Bluetooth low energy (BLE) protocol, ultra-wideband (UWB) protocol, and similar directional sensitive wireless protocol may be utilized to create a mesh of radio-based enabled devices in a vehicle, establish the locations of the devices, and associate the devices to respective users (or occupants). The mesh may identify who is using the assistive devices (e.g., hearing aids). The users are generally provided an opportunity to register themselves via a profile and disclose whether the device being used is an impairment-use assistive device. Processing circuitry provides augmentation and/or processing of signals routed to each user. In various embodiments, an artificial intelligence agent may direct an utterance spoken by one occupant directly to the device of an intended recipient occupant. The artificial intelligence agent may transform the spoken words as audio or text in real time to device screens and/or Braille readers. Such transformations enable users with hearing impairments/visual impairments to participate in conversations.

Figure 1:
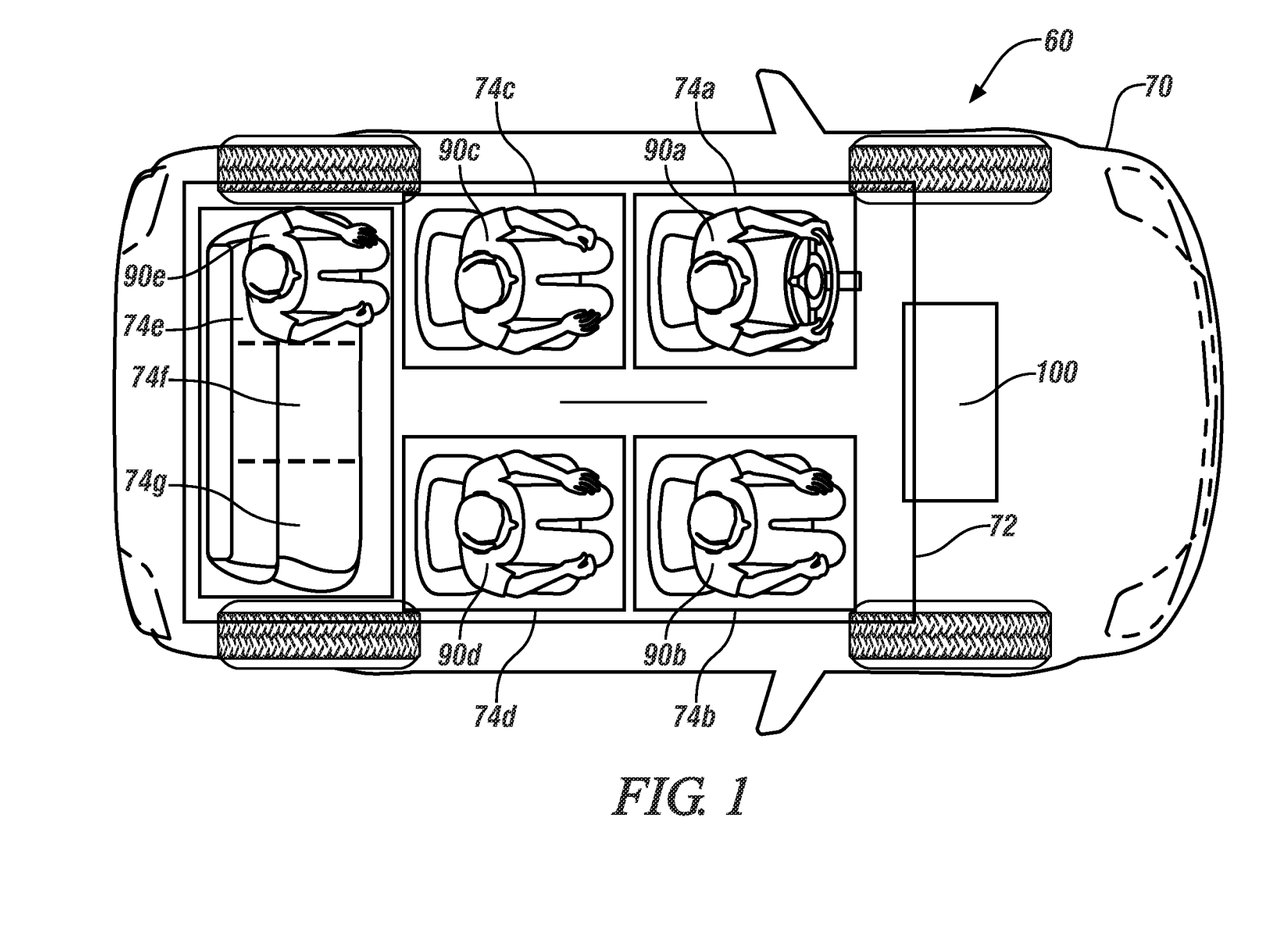
FIG. 1 is a schematic plan diagram of a context of an environment around a vehicle in accordance with one or more exemplary embodiments.

Referring to FIG. 1, a schematic plan diagram of an example context of an environment 60 around a vehicle 70 is shown in accordance with one or more exemplary embodiments. The vehicle 70 resides on the ground (e.g., a roadway) at a current location. The vehicle 70 generally includes a crew cabin 72 with multiple seats (or user locations) 74a-74g that may be occupied by users 90a-90e, and a communication augmentation system 100.

The vehicle 70 implements a gas-powered vehicle, an electric vehicle, a hybrid vehicle, or a plug-in hybrid vehicle. In various embodiments, the vehicle 70 may include, but is not limited to, a passenger vehicle, a truck, an autonomous vehicle, a motorcycle, a boat, and/or an aircraft. Other types of vehicles 70 may be implemented to meet the design criteria of a particular application.

The user locations 74a-74g implement individual seats and possibly a bench seat. The users 90a-90e generally include a driver 90a and passengers 90b-90e. While several user locations 74a-74g and several users 90a-90e are illustrated, various embodiments of the vehicle 70 may include a smaller or a greater number of the user locations 74a-74g with a smaller or a greater number of the users 90a-90e.

The communication augmentation system 100 implements an intra-vehicle message relaying system. The communication augmentation system 100 is operable to record an image of the users 90a-90e currently within the crew cabin 72, determine the user locations 74a-74g of the users 90a-90e (e.g., who is sitting in which seat) based on the image, receive inbound messages from wireless devices 92a-92e (see FIG. 2), determine device locations 94a-94e (FIG. 2) where the wireless devices 92a-92e are located based on the inbound messages, and associate the wireless devices 92a-92e with the users 90a-90e based on the user locations 74a-74g and the device locations 94a-94e. The communication augmentation system 100 is further operational to determine destinations 96a-96n (FIG. 2) of the inbound messages (e.g., who gets which message) based on a comparison of the inbound messages to identifiers of the users 90a-90e, and transmit outbound messages to the wireless devices based on the destinations 96a-96n.

Figure 2:
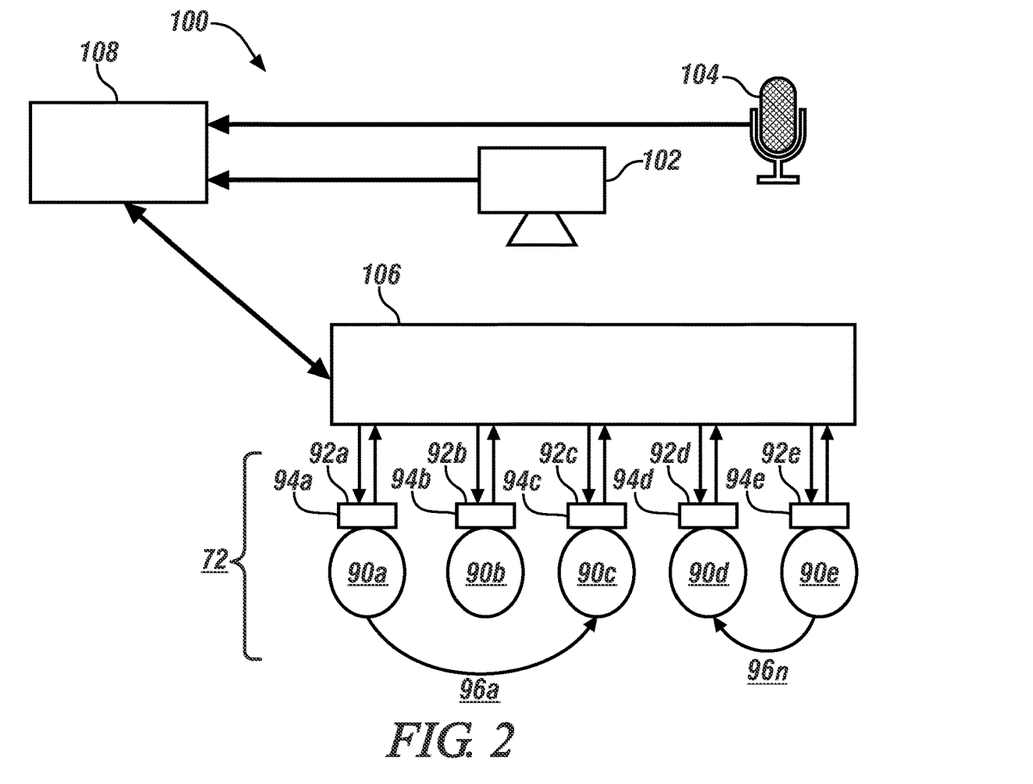
FIG. 2 is a schematic diagram of a communication augmentation system with users and wireless devices in accordance with one or more exemplary embodiments.

Referring to FIG. 2, a schematic diagram of an example implementation of the communication augmentation system 100, the users 90a-90e, and the wireless devices 92a-92e is shown in accordance with one or more exemplary embodiments. The communication augmentation system 100 includes a camera 102, one or more microphones 104 (one shown), a transceiver 106, and computer 108.

The wireless device 92a-92e implement bidirectional radio-frequency communication devices. The wireless devices 92a-92e are operational to relay information provided by the respective users 90a-90e as input content in the incoming messages to the transceiver 106. The wireless devices 92a-92e are also operational to relay output content received in the outgoing messages from the transceiver 106 to the respective users 90a-90e. In various embodiments, the wireless devices 92a-92e may include, but are not limited to, cell phones, tablets, Braille devices, and hearing aids. The wireless devices 92a-92e communicate with the transceiver 106 with one or more protocols. The protocols may include, but are not limited to, Bluetooth, Bluetooth low energy, ultra-wideband protocol and ZigBee. Other wireless protocols that support directional detection may be implemented to meet the design criteria of a particular application. The wireless devices 92a-92e generally reside at device locations 94a-94e. The device locations 94a-94e are moveable within the crew cabin 72.

Audio may be played over the wireless devices 92a-92e (e.g., commercial mobile phone/tablet device speakers) and optionally mediated via applications executing on the wireless devices 92a-92e. The users 90a-90e may selectively enable and disable the audio and/or Bluetooth devices paired to the wireless devices 92a-92e. Speech audio may be also played through commercial Bluetooth headphones and speakers directly paired to the vehicle 70 (e.g., not mediated via the wireless devices 92a-92e). The speech may be captioned in real time and output to wireless devices 92a-92e (also optionally controlled via applications executed in the wireless devices 92a-92e.)

The camera 102 implements a visual camera. In various embodiments, the camera 102 may be a video camera. In other embodiments, the camera 102 may be a still-image camera. The camera 102 is operational to record one or more images of an interior of the crew cabin 72 that includes the users 90a-90e. The image may be presented to the computer 108 for analysis.

The microphone(s) 104 implement audio-frequency sensors. Each microphone 104 is operational to convert sounds spoken by the users 90a-90e into corresponding electrical signals. The electrical signals are transferred to the computer 108 for analysis.

The transceiver 106 implements a multi-channel radio-frequency transceiver. The transceiver 106 is operational to receive the incoming messages from the wireless devices 92a-92e, and transmit the outgoing message to the wireless devices 92a-92e. The transceiver 106 communicates with the wireless devices 92a-92e with one or more protocols. The protocols may include, but are not limited to, Bluetooth, Bluetooth low energy, ultra-wideband protocol and ZigBee. Other wireless protocols that support directional detection may be implemented to meet the design criteria of a particular application.

The computer 108 implements one or more processors, each of which may be embodied as a separate processor, one or more application specific integrated circuits (ASIC or field programmable gate arrays (FPGA), and/or dedicated electronic control circuitry. The computer 108 is operational to determine where the users 90a-90e are located within the crew cabin 72, determine where the wireless devices 92a-92e are located (the device locations 94a-94e), and associate the users 90a-90e with the wireless devices 94a-94e. The locations of the users 90a-90e may be determine using pre-registered facial profiles and/or voice biometrics, if available. When the computer 108 receives an incoming message from one of the wireless devices 94a-94e via the transceiver 106, the computer 108 is operational to determine when the input contents (e.g., audible voice or text) should be routed. For example, an incoming message from the user 90a via the wireless device 92a may have a destination 96a of the wireless device 92c for the user 90c. In another example, an incoming message from the user 90e via the wireless device 92e may have a destination 96n of the wireless device 92d for the user 90d.

The processors may be implemented in hardware, software executing on hardware, or a combination of both. The computer 108 include tangible, non-transitory memory (e.g., read-only memory in the form of optical, magnetic, and/or flash memory). For example, the computer 108 may include application-suitable amounts of random-access memory, read-only memory, flash memory and other types of electrically erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the computer 108 (either in the foreground or background). The computer 108 may receive commands and information, in the form of one or more input signals from various controls or components in the vehicle 70, the camera 102, the microphone 104 and the transceiver 106, and communicate instructions to the other electronic components.

Figure 3:
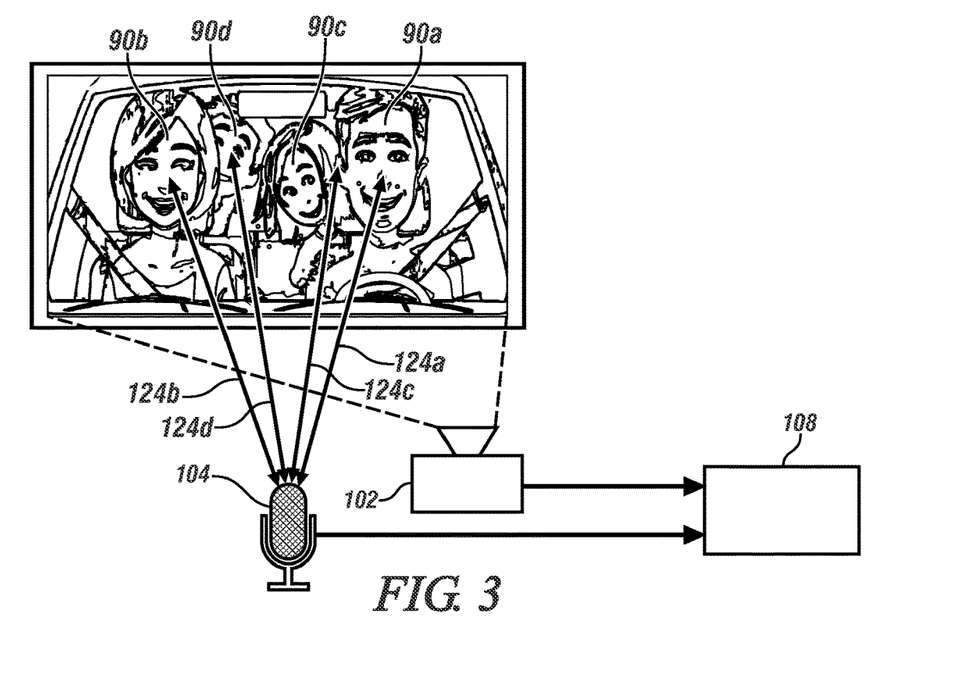
FIG. 3 is a schematic side diagram of a view of a crew cabin in accordance with one or more exemplary embodiments.

Referring to FIG. 3, a schematic side diagram of an example view of the crew cabin 72 is shown in accordance with one or more exemplary embodiments. The view in the example is illustrated looking into the crew cabin 72 through the front windshield.

The camera 102 may record an image 122 of several users 90a-90d. The microphone 104 may record sounds 124a-124d spoken by the individual user 90a-90d. The image 122 and the sounds 124a-124d are transferred to the computer 108 for a determination of where the users 90a-90d are located within the crew cabin 72.

Figure 4:
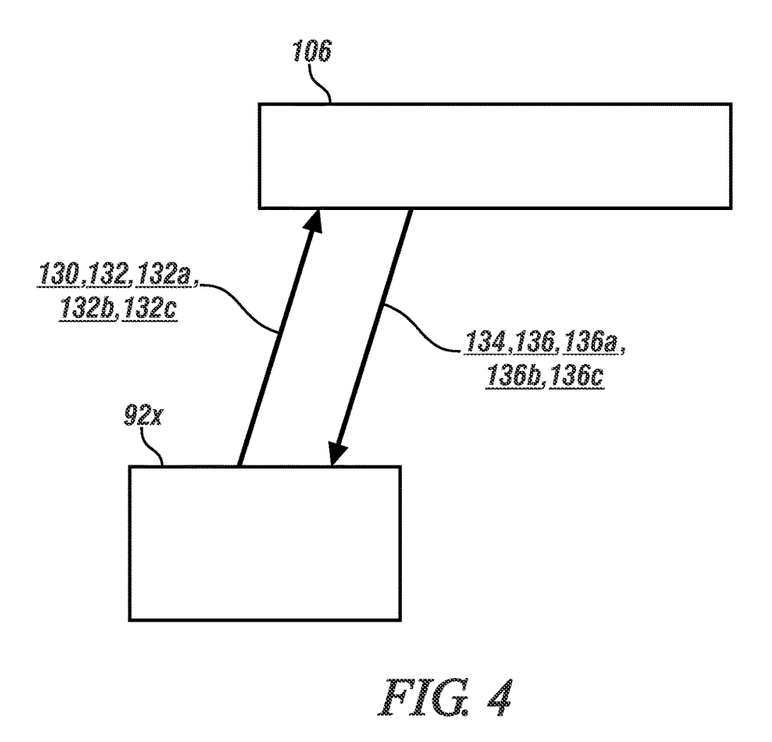
FIG. 4 is a schematic plan view of bidirectional communication between a transceiver and a wireless device in accordance with one or more exemplary embodiments.

Referring to FIG. 4, a schematic plan view of an example bidirectional communication between the transceiver 106 and a wireless device 92x is shown in accordance with one or more exemplary embodiments. The wireless device 92x may be representative of each wireless device 92a-92e.

The wireless device 92x may generate and transmit an inbound message 130 to the transceiver 106. The inbound message 130 may convey an input content 132. In some situations, the input content 132 may be an audio input content 132a (e.g., spoken words). The audio input content 132a is transferred with an input quality 132b (or fidelity). In other situations, the input content 132 may be a text input content 132c (e.g., a text message).

The wireless device 92x may also receive an outbound message 134 from the transceiver 106. The outbound message 134 may convey an output content 136. In some situations, the output content 136 may be an audio output content 136a (e.g., spoken words). The audio output content 136a is transferred with an outbound quality 136b (or fidelity). In other situations, the output content 136 may be a text output content 136c (e.g., a text message).

Figure 5:
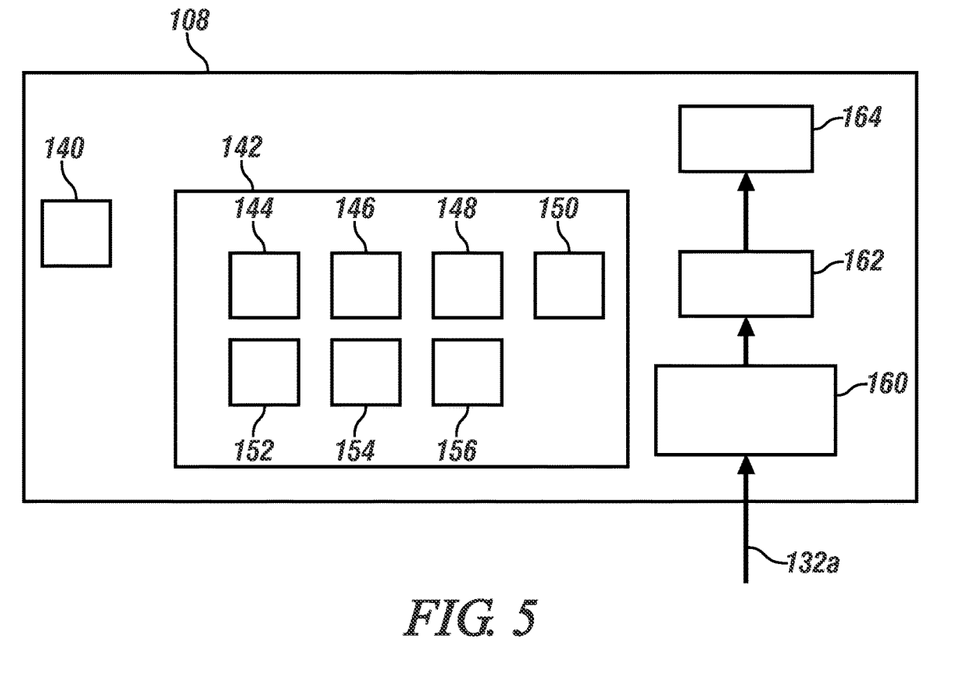
FIG. 5 is a schematic diagram of a computer in accordance with one or more exemplary embodiments.

Referring to FIG. 5, a schematic diagram of an example implementation of the computer 108 is shown in accordance with one or more exemplary embodiments. The computer 108 may execute an artificial intelligence agent 140, store the registrations 142, and in some embodiments, may include a speech recognition engine 160. The registrations 142 generally include facial recognition profiles 144 of the users 90a-90e, identifications 146 of the users 90a-90e, voiceprints 148 of the users 90a-90e, hearing impairment 150 designations for some of the users 90a-90e, vision impairments 152 from some of the users 90a-90e, user capabilities 154 and/or biometrics 156 of the users 90a-90e. A prior knowledge of occupant disability and the devices being used, such as hearing aids, may also be leveraged to provide a better user experience. For example, audio may be projected to Bluetooth enabled hearing aids with increased clarity and/or intelligibility, and at a proper level (or volume) to be audible for the recipients. Other data may be registered and utilized to meet the design criteria of a particular application.

The users 90a-90e generally create a self-profile in the registrations 142 by recording the facial recognition profiles 144, the identifications 146 and the voiceprints 148, either using mobile applications running on the wireless devices 92a-92e or using the in-car camera 102 and/or the microphone 104. The self-profile may include registering the wireless devices 92a-92e and identify which wireless devices 92a-92e incorporate/implement assistive technologies such as hearing aids or Braille displays. In various embodiments, the users 90a-90e may self-register other data (e.g., gender/age group/disability or challenges or assistive devices) or the communication augmentation system 100 may infer such qualities automatically based on the image 122 and the sounds 124a-124e. The users 90a-90e may also explicitly declare disabilities and respective user locations 74a-74g in the vehicle 70.

Using the protocols implemented by the wireless devices 92a-92e and the transceiver 106 (e.g., BLE and UWB protocols) a mesh is established of enabled wireless devices 92a-92e, the device locations 94a-94e are established, and the wireless devices 92a-92e are linked to the respective users 90a-90e, noting who is using assistive devices. The mesh protocols may also provide the user locations 74a-74g of the users 90a-90e within the vehicle 70, (e.g., front right, middle row left, rear right, etc.).

The computer 108 may access the registration 142 to know how to augment and/or process the output content within the outbound signals for each user 90a-90e. The artificial intelligence agent 140 may be trained to understand whether an individual utterance is meant for a specific user 90a-90e or multiple users 90a-90e and subsequently direct the utterance accordingly. The artificial intelligence agent 140 may project the utterance to an intended recipient device either as audio or text (e.g., provide real time speech-to-text translations) to device screens and/or Braille readers of the wireless devices 92a-92e. Augmentation and continuous tracking of the input audio/speech quality 132b of voice messages is performed by the artificial intelligence agent 140 to transform the input content 132 into the appropriate output content 136 for the type of target (assistive) wireless device 92a-92e. In various embodiments, the artificial intelligence agent 140 may interface with the wireless devices 92a-92e indirectly via applications running on the wireless devices 92a-92e. For example, the artificial intelligence agent 140 may connect to a smartphone/tablet type wireless device 92a-92e to project audio to such wireless devices 92a-92e already paired with the smartphone/tablet without additional pairing/registration.

The speech recognition engine 160 implements a speech-to-text conversion technique. The speech recognition engine 160 is operational to convert audio input content 132a into dictation text 162. The speech recognition engine 160 may be configured to recognize the audio input content 132a in one or several languages (e.g., English).

Figure 6:
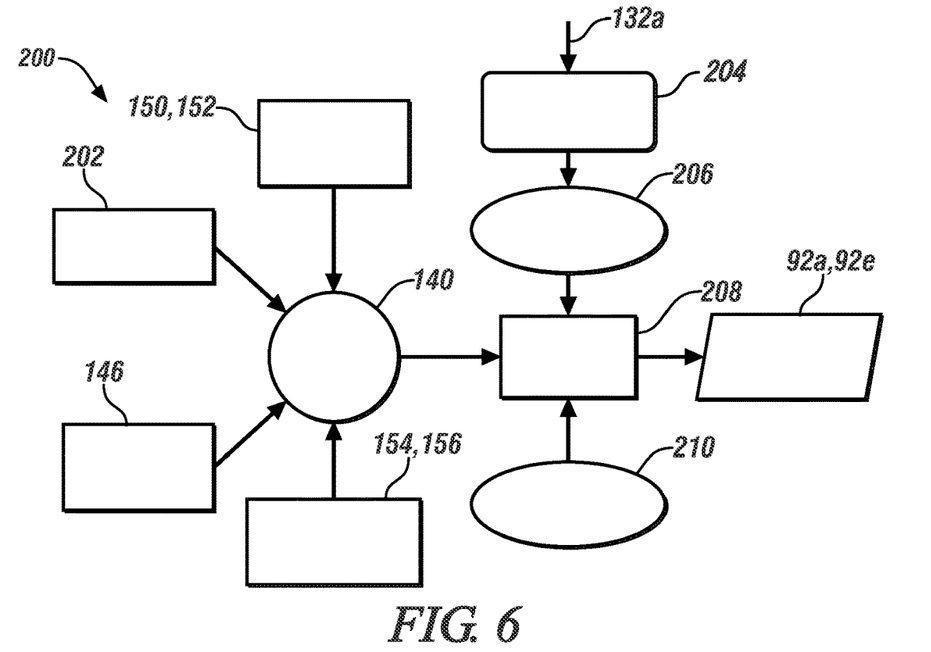
FIG. 6 is a flow diagram of a first data flow within the communication augmentation system in accordance with one or more exemplary embodiments.

Referring to FIG. 6 and FIG. 4, a flow diagram of an example first data flow 200 within the communication augmentation system 100 is shown in accordance with one or more exemplary embodiments. The first data flow 200 includes location content 202, natural language understanding agent 204, arbitration 206, modality optimization 208, and audio processing 210. The first data flow 200 is performed by the communication augmentation system 100 in connection with the wireless devices 92a-92e.

The artificial intelligence agent 140 may draw from the location content 202, the user identification 146, the capabilities 154 and the biometrics 156 to determine destinations and capabilities of the receiving wireless devices 92a-92e. The natural language understanding agent 204 may identify spoken words in the audio input content 132a received from the wireless devices 92a-92e via the transceiver 106. The identified spoken words may be referred to as dictation text. The arbitration 206 may select between the dictation text and a concise (or curtailed) version of the text based on the target wireless device 92a-92e and impairments of the respective user 90a-90e. Audio processing 210 may be applied while generating the output content 136 to make the output content 136 more understandable. The audio processing 210 may include, but is not limited to, automatic gain, background noise suppression and echo cancellation. After the audio processing 210 and/or dictation/concise text have been completed, the output content 136 may be transferred to one or more wireless devise 92a-92e (FIG. 2).

Figure 7:
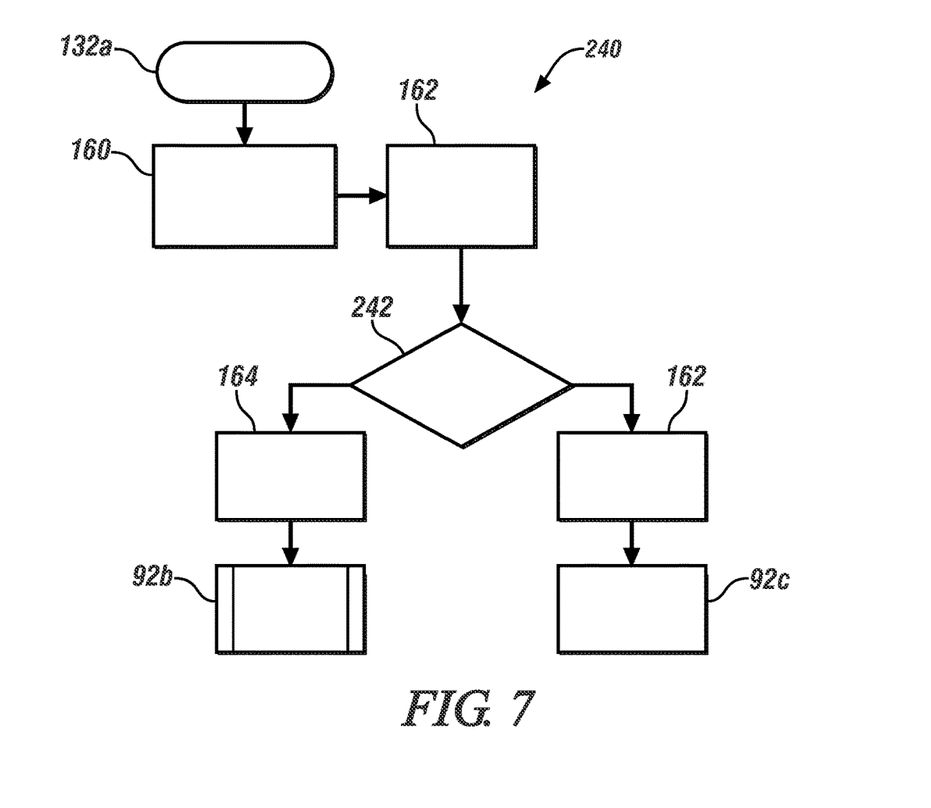
FIG. 7 is a flow diagram of a second data flow within the communication augmentation system in accordance with one or more exemplary embodiments.

Referring to FIG. 7 and FIG. 4, a flow diagram of an example second data flow 240 within the communication augmentation system 100 is shown in accordance with one or more exemplary embodiments. The second data flow 240 includes the speech recognition engine 160. The second data flow 240 is performed by the communication augmentation system 100 in connection with the wireless devices 92a-92e.

The audio input content 132a is received by the speech recognition engine 160. The speech recognition engine 160 converts the audio content into the dictation text 162. A determination 242 is made if the dictation text 162 represents a behavioral (e.g., casual) conversation or an intent oriented (e.g., focused) conversation. If the determination 242 concludes an intent orient conversation, the dictation text 162 may be reduced to concise text 164 (e.g., a shortened version) and subsequently transmitted to the destination (e.g., wireless device 92b) for display. For example, the concise text 164 may be created for simplified reading on a Braille type wireless device 92b. If the determination 242 concludes a behavioral orient conversation, the original dictation text 162 is transmitted to a screen type (e.g., scroll-based output) wireless device (e.g., 92c).

Figure 8:
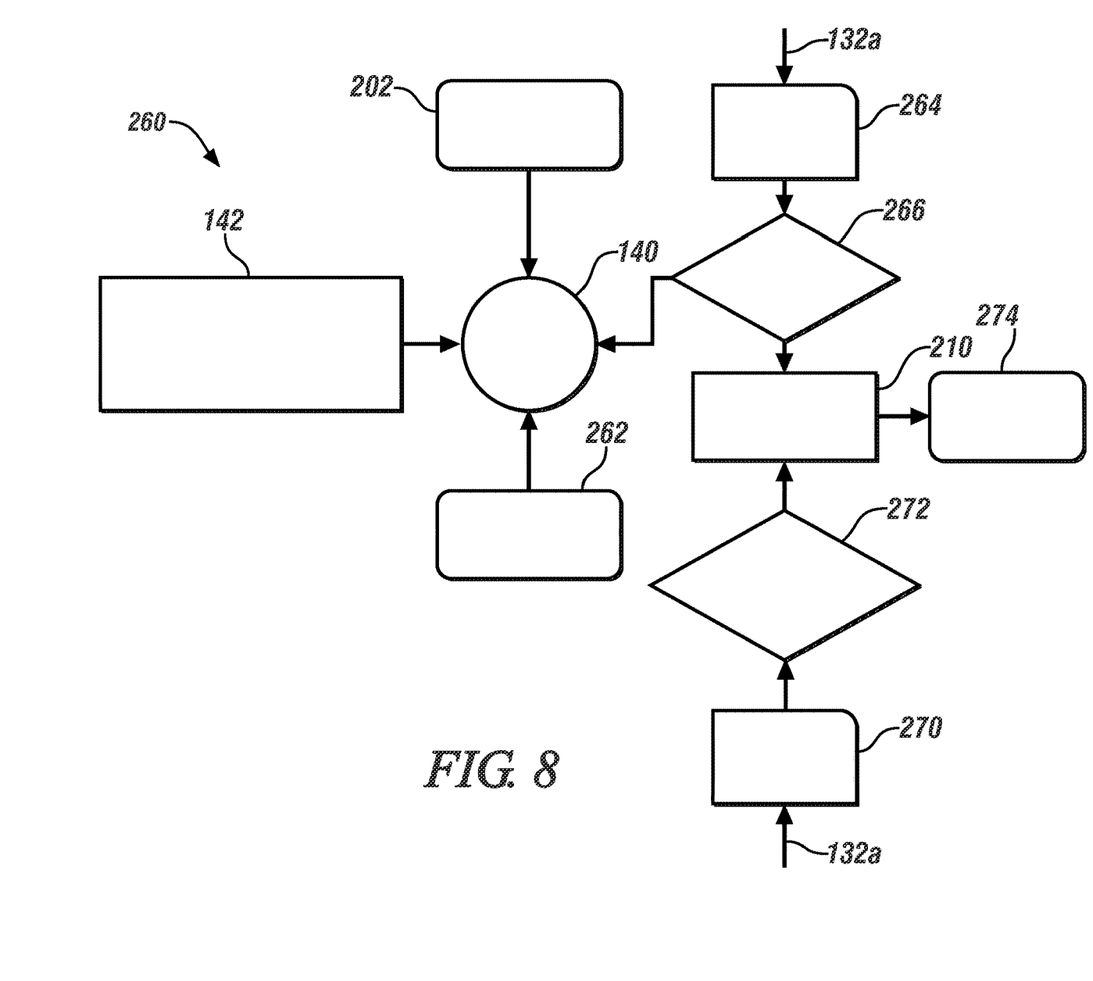
FIG. 8 is a flow diagram of a third data flow within the communication augmentation system in accordance with one or more exemplary embodiments.

Referring to FIG. 8 and FIG. 4, a flow diagram of an example third data flow 260 within the communication augmentation system 100 is shown in accordance with one or more exemplary embodiments. The third data flow 260 is performed by the communication augmentation system 100 in connection with the wireless devices 92a-92e.

The artificial intelligence agent 140 may draw from the location content 202, the user registrations 142 and wireless device information 262 to determine destinations and capabilities of the receiving wireless devices 92a-92e. Information read from the user registrations 142 generally included disabilities, declarations on assistive device (e.g., hearing aids and Braille compatible devices), and biometric registrations. The biometric registrations may include the facial profiles 144 and the voiceprints 148 (FIG. 5). The wireless device information 262 includes side-bar metadata information, audio criteria, speech codecs and the like.

In various embodiments, the audio input content 132a is received by a user engagement model 264 that determine the input quality 132b. If the input quality 132b is acceptable per an audio quality check 266, the artificial intelligence agent 140 is notified and the audio input content 132a may be passed to the transceiver 106 for transmission as one or more outbound messages 134 to one or more wireless receivers 92a-92e. After the audio processing 210, the improved output content 136 is provided to the transceiver 106 for transmission to one or more wireless receivers 92a-92e.

In some embodiments, the audio input content 132a is received by a checking block 270. The checking block compares the input quality 132b with an ITU standard on non-intrusive speech quality estimation. A check 272 is performed to determine if the input quality 132b meets a predicted mean opinion score (MOS) audio quality and an intelligibility is greater than a threshold. If the check 272 fails the quality and/or the intelligibility, the audio input content 132a is processed by the audio processing 210. If the check 272 meets both the quality and the intelligibility, the artificial intelligence agent 140 is informed and the audio input content 132a is transmitted to the one or more wireless devices 92a-92e in the step 274.

Figure 9:
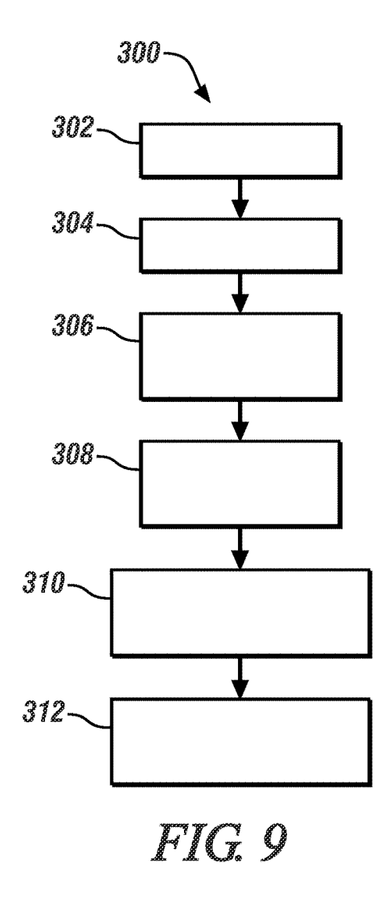
FIG. 9 is a flow diagram of a method for augmented communication in accordance with one or more exemplary embodiments.

Referring to FIG. 9, a flow diagram of an example method 300 for augmented communication is shown in accordance with one or more exemplary embodiments. The method (or process) 300 is implemented by the communication augmentation system 100. The method 300 includes steps 302 to 312, as illustrated. The sequence of steps is shown as a representative example. Other step orders may be implemented to meet the criteria of a particular application.

In the step 302, the communication augmentation system 100 is initialized. The initialization includes, powering up, determining where the users 90a-90e are located, determining where the wireless devices 92a-92e are located, and storing links between the wireless devices 92a-92e and the users 90a-90e in the computer 108. In the step 304, the computer 108 may receive inbound messages from the wireless devices 92a-92n. As the users 90a-90e communicate with each other via the wireless devices 92a-92e, the destinations of the inbound messages are determined based on a comparison of the input content in the inbound messages to the identifiers using the artificial intelligence agent 140 in the step 306. Where appropriate, additional processing may be provided by the computer 108 in the step 308 before the input content is sent to the receiving wireless devices 92a-92e. In the step 310, the computer 108 transfers the output content (e.g., an original copy or enhanced copy of the input content) and the destinations to the transceiver 106. The transceiver 106 transmits the output content/ dictation text/concise text in the outbound messages to the wireless devices 92a-92e based on the destinations in the step 312. Each output content derived from a single input content may be modified differently to accommodate the different recipient users 90a-90e. For example, source user 90b may send out an audio message that is related unaltered to a destination user 90c and is translated to text for a destination user 90d.

Figure 10:
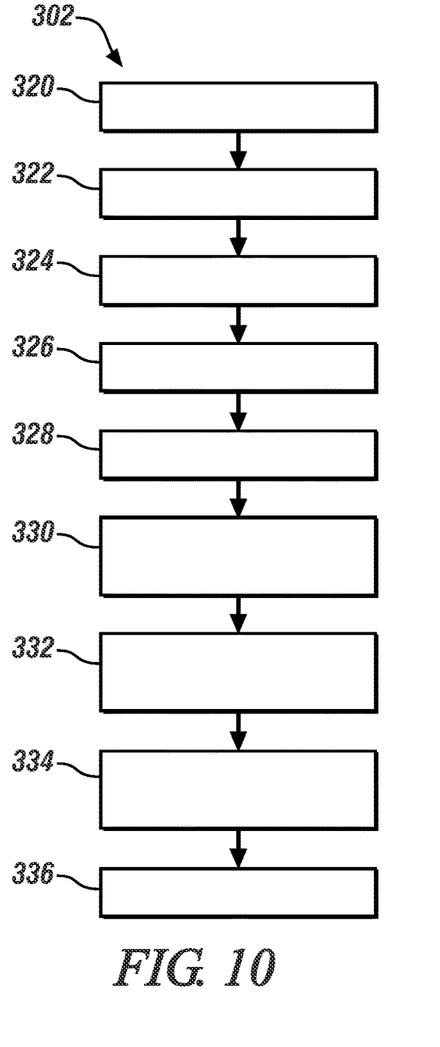
FIG. 10 is a flow diagram of a detailed implementation of an initialization step in accordance with one or more exemplary embodiments.

Referring to FIG. 10, a flow diagram of an example detailed implementation of the initialization step 302 is shown in accordance with one or more exemplary embodiments. The step 302 generally includes steps 320 to 336, as illustrated. The sequence of steps is shown as a representative example. Other step orders may be implemented to meet the criteria of a particular application.

In the step 320, the registrations 142 of the users 90a-90e are stored in a database accessible by, or incorporated within the computer 108. The vehicle 70 may be started in the step 322. Upon powering up, the communication augmentation system 100 reads the registrations 142 from the database in the step 324. The image 122 is recorded by the camera 102 in the step 326. The sounds 124a-124e from the users 90a-90e are recorded by the microphone 104 in the step 328.

In the step 330, the computer 108 determines the user locations 74a-74g of where the users 90a-90e are seated in response to the facial profiles 144 relative to the image 122 and/or the sounds 124a-124e relative to the voiceprints 148. The device locations 94a-94e of the wireless devices 92a-92e are determined in the step 332 based on the inbound messages 130. In the step 334, the wireless devices 92a-92e are associated with the users 90a-90e based on device locations 94a-94e relative to the user locations 74a-74g. The associates are stored in the computer 108 in the step 336.

Figure 11:
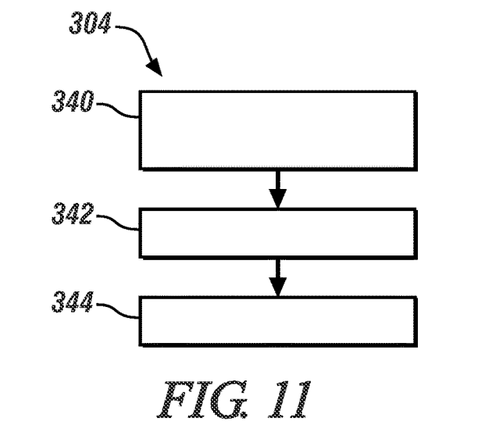
FIG. 11 is a flow diagram of a detailed implementation of a receive step in accordance with one or more exemplary embodiments.

Referring to FIG. 11, a flow diagram of an example detailed implementation of the receive step 304 is shown in accordance with one or more exemplary embodiments. The step 304 generally includes steps 340 to 344, as illustrated. The sequence of steps is shown as a representative example. Other step orders may be implemented to meet the criteria of a particular application.

In the step 340, the communication augmentation system 100 receives the inbound messages from the wireless devices 92a-92e with the transceiver 106. Where a particular inbound message 130 conveys audio input content 132a, the computer 108 tracks a quality of the audio input content 132a in the step 342. Where the quality renders the audio input content 132a unintelligible, the quality is enhanced in the step 344 prior to transferring to the transceiver 106.

Figure 12:
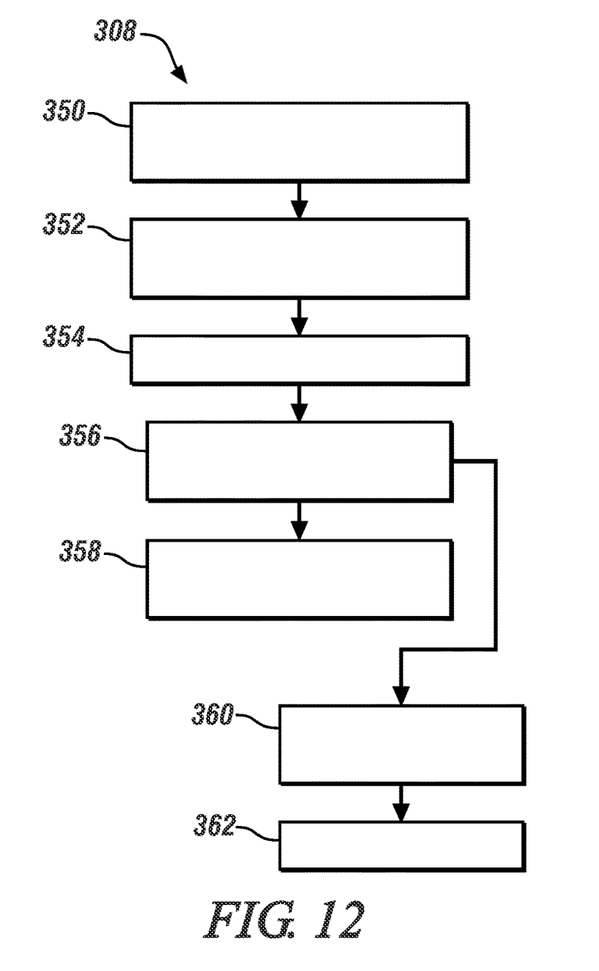
FIG. 12 is a flow diagram of a detailed implementation of an additional processing step in accordance with one or more exemplary embodiments.

Referring to FIG. 12, a flow diagram of an example detailed implementation of the additional processing step 308 is shown in accordance with one or more exemplary embodiments. The step 308 generally includes steps 350 to 362, as illustrated. The sequence of steps is shown as a representative example. Other step orders may be implemented to meet the criteria of a particular application.

In the step 350, the computer 108 determines where a particular destination(s) 96a-96n correspond to a hearing impairment and/or a vision impairment. Where a hearing impairment is found at the particular destination 96a-96n, the input content 132 is converted (or translated) in the step 352 from speech to text prior to transferring to the transceiver 106 for transmission to the particular destination 96a-96n with the hearing impairment. Where a vision impairment is found at the particular destination 96a-96n, dictation text 162 is generated in the step 354 from an audio input content 132a with the speech recognition engine 160 or the natural language understanding agent 204.

In the step 356, a determination may be made if the dictation text 162 is behavior oriented or intent oriented. Where the dictation text 162 is behavior oriented, the dictation text 162 is transferred in the step 358 to the transceiver 106 for subsequent transmission. Where the dictation text 162 is behavior oriented, the concise text 164 is generated in the step 360. The concise text 164 is subsequently transferred to the transceiver 106 in the step 362 for transmission.

The Bluetooth low energy protocol and/or ultra-wideband protocol may be used to create a mesh of Bluetooth-enabled wireless devices 92a-92e in the vehicle 70. The mesh helps establish the locations of the wireless devices 92a-92e and associate wireless devices 92a-92e with respective users 90a-90e. The mesh may also identify who is using assistive devices. Additional side bar information about the wireless devices 92a-92e may be being included in the mesh, especially for the wireless devices 92a-92e being used for hearing aids. A user profile tuple may be created to include a user identity and an associated wireless device. Facial recognition and/or voice biometrics may serve as a medium to identify the users 90a-90e. The wireless device information may include affirmation as an assistive device. The communication augmentation system 100 knows when and how to augment/process the inbound messages based on each destination occupant. The artificial intelligence agent 140 directs utterances directly to the wireless devices 92a-92e of the intended recipient(s) either as audio and/or text to device screens/Braille readers. The visual/Braille presentations enable passengers with hearing/visual impairments to participate in the conversations.

Embodiments of the disclosure generally provide a communication augmentation system. A camera is operation to record an image of a plurality of users. A transceiver is operational to receive inbound messages from wireless devices. The inbound messages include input content. A computer is in communication with the transceiver and the camera. The computer is operational to store registrations of the users. The registrations include facial profiles and identifiers. The computer is further operational to determine user locations where the users are located in response to the facial profiles relative to the image, determine device locations where the wireless devices are located based on the directions of the inbound messages, associate the wireless devices with the users based on the user locations and the device locations, determine destinations of the inbound messages based on a comparison of the input content to the identifiers, and transfer the input content, as-received or modified as output content, and the destinations to the transceiver. The transceiver is further operational to transmit the input content in outbound messages to the wireless devices based on the destinations.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A communication augmentation system comprising:
   a camera operation to record an image of a plurality of users;
   a transceiver operational to receive a plurality of inbound messages from a plurality of wireless devices, wherein the plurality of inbound messages include a plurality of input content; and
   a computer in communication with the transceiver and the camera, wherein the computer is operational to:
     store a plurality of registrations of the plurality of users, wherein the plurality of registrations include a plurality of facial profiles and a plurality of identifiers;
     determine a plurality of user locations where the plurality of users are located in response to the plurality of facial profiles relative to the image;
     determine a plurality of device locations where the plurality of wireless devices are located based on the plurality of inbound messages;
     associate the plurality of wireless devices with the plurality of users based on the plurality of user locations and the plurality of device locations;

determine a plurality of destinations of the plurality of inbound messages based on a comparison of the plurality of input content to the plurality of identifiers; and transfer the plurality of input content and the plurality of destinations to the transceiver, wherein the transceiver is further operational to:

transmit the plurality of input content in a plurality of outbound messages to the plurality of wireless devices based on the plurality of destinations.

2. The communication augmentation system according to claim 1, further comprising:

a microphone in communication with the computer and operational to record a plurality of sounds from the plurality of users, wherein:

the plurality of registrations includes a plurality of voiceprints of the plurality of users; and the computer is operational to determine the plurality of user locations in further response to the plurality of sounds relative to the plurality of voiceprints.

3. The communication augmentation system according to claim 1, further comprising:

an artificial intelligence agent executed by the computer, wherein the artificial intelligence agent is operational to:

determine the plurality of destinations of the plurality of inbound messages.

4. The communication augmentation system according to claim 3, wherein:

the plurality of registrations of the plurality of users includes a hearing impairment among one or more of the plurality of users;

the artificial intelligence agent is further operational to determine where a particular destination of the plurality of destinations corresponds to the hearing impairment; and the artificial intelligence agent is further operational to translate a particular input content of the plurality of input content from speech to text prior to transferring to the transceiver for transmission to the particular destination with the hearing impairment.

5. The communication augmentation system according to claim 3, wherein the artificial intelligence agent is further operational to:

track a quality of a particular input content among the plurality of input content; and enhance the quality of the particular input content prior to transferring to the transceiver.

6. The communication augmentation system according to claim 1, further comprising:

a speech recognition engine operational to generate dictation text from an audio input content of the plurality of input content.

7. The communication augmentation system according to claim 6, wherein the computer is further operational to:

determine if the dictation text is one of behavior oriented and intent oriented, wherein the plurality of registrations of the plurality of users includes a vision impairment among one or more of the plurality of users.

8. The communication augmentation system according to claim 7, wherein the computer is further operational to:

transfer the dictation text to the transceiver in response to determining that the dictation text is behavior oriented.

9. The communication augmentation system according to claim 7, wherein the computer is further operational to:

generate concise text from the dictation text in response to determining that the dictation text is intent oriented and a particular destination of the plurality of destinations corresponds to the vision impairment, wherein the concise text is shorter than the dictation text; and transfer the concise text to the transceiver.

10. The communication augmentation system according to claim 1, wherein the camera, the transceiver and the computer are implemented in a vehicle.

11. A method for augmented communication comprising:

recording an image of a plurality of users with a camera;

receiving a plurality of inbound messages from a plurality of wireless devices with a transceiver, wherein the plurality of inbound messages include a plurality of input content;

storing a plurality of registrations of the plurality of users, wherein the plurality of registrations include a plurality of facial profiles and a plurality of identifiers;

determining a plurality of user locations where the plurality of users are located in response to the plurality of facial profiles relative to the image;

determining a plurality of device locations where the plurality of wireless devices are located based on the plurality of inbound messages;

associating the plurality of wireless devices with the plurality of users based on the plurality of user locations and the plurality of device locations;

determining a plurality of destinations of the plurality of inbound messages based on a comparison of the plurality of input content to the plurality of identifiers;

transferring the plurality of input content and the plurality of destinations to the transceiver; and transmitting the plurality of input content in a plurality of outbound messages to the plurality of wireless devices based on the plurality of destinations.

12. The method according to claim 11, further comprising:

recording a plurality of sounds from the plurality of users with a microphone, wherein:

the plurality of registrations includes a plurality of voiceprints of the plurality of users; and the determining of the plurality of user locations is in further response to the plurality of sounds relative to the plurality of voiceprints.

13. The method according to claim 11, wherein:

the determining of the plurality of destinations of the plurality of inbound messages is made using an artificial intelligence agent.

14. The method according to claim 13, further comprising:

determining where a particular destination of the plurality of destinations corresponds to a hearing impairment; and translating a particular input content of the plurality of input content from speech to text prior to transferring to the transceiver for transmission to the particular destination with the hearing impairment, wherein the plurality of registrations of the plurality of users includes the hearing impairment among one or more of the plurality of users.

15. The method according to claim 13, further comprising:

tracking a quality of a particular input content among the plurality of input content; and enhancing the quality of the particular input content prior to transferring to the transceiver.

16. The method according to claim 11, further comprising:

generating dictation text from an audio input content of the plurality of input content with a speech recognition engine.

17. The method according to claim 16, further comprising:
determining if the dictation text is one of behavior oriented and intent oriented, wherein the plurality of registrations of the plurality of users includes a vision impairment among one or more of the plurality of users.

18. The method according to claim 17, further comprising:
transferring the dictation text to the transceiver in response to determining that the dictation text is behavior oriented.

19. The method according to claim 17, further comprising:
generating concise text from the dictation text in response to determining that the dictation text is intent oriented and a particular destination of the plurality of destinations corresponds to the vision impairment, wherein the concise text is shorter than the dictation text; and
transferring the concise text to the transceiver.

20. A vehicle comprising:
a crew cabin operational to hold a plurality of users;
a camera operational to record an image of the plurality of users in the crew cabin;
a transceiver operational to:
receive a plurality of inbound messages from a plurality of wireless devices, wherein the plurality of inbound messages include a plurality of input content;
a computer in communication with the transceiver and the camera, wherein the computer is operational to:
store a plurality of registrations of the plurality of users, wherein the plurality of registrations include a plurality of facial profiles and a plurality of identifiers;
determine a plurality of user locations where the plurality of users are located in response to the plurality of facial profiles relative to the image;
determine a plurality of device locations where the plurality of wireless devices are located based on the plurality of inbound messages;
associate the plurality of wireless devices with the plurality of users based on the plurality of user locations and the plurality of device locations;
determine a plurality of destinations of the plurality of inbound messages based on a comparison of the plurality of input content to the plurality of identifiers; and
transfer the plurality of input content and the plurality of destinations to the transceiver, wherein
the transceiver is further operational to:
transmit the plurality of input content in a plurality of outbound messages to the plurality of wireless devices based on the plurality of destinations.

* * * * *